(12) United States Patent
Del Porto

(10) Patent No.: US 7,513,997 B2
(45) Date of Patent: Apr. 7, 2009

(54) RECIRCULATING WASTEWATER EVAPOTRANSPIRATION AND DISINFECTION SYSTEM

(75) Inventor: David Anthony Del Porto, 448 Ward St., Newton, MA (US) 02459

(73) Assignee: David Anthony Del Porto, Newton, MA (US)

( * ) Notice: Subject to any disclaimer, the term of this patent is extended or adjusted under 35 U.S.C. 154(b) by 157 days.

(21) Appl. No.: 11/618,997

(22) Filed: Jan. 2, 2007

(65) Prior Publication Data

US 2008/0156724 A1 Jul. 3, 2008

(51) Int. Cl.
C02F 3/32 (2006.01)
C02F 1/32 (2006.01)
C02F 1/78 (2006.01)

(52) U.S. Cl. .................. 210/602; 210/616; 210/621; 210/631; 210/748; 210/150; 210/175; 210/205; 210/259

(58) Field of Classification Search ............... 210/602, 210/620, 621, 622, 175, 181, 195.1, 205, 210/252, 259, 616, 631, 748, 150
See application file for complete search history.

(56) References Cited

U.S. PATENT DOCUMENTS

| | | | | |
|---|---|---|---|---|
| 4,174,371 A * | 11/1979 | Bell et al. | ..................... | 4/111.1 |
| 4,415,450 A * | 11/1983 | Wolverton | .................. | 210/602 |
| 5,637,218 A * | 6/1997 | Kickuth | ..................... | 210/602 |
| 7,001,519 B2 * | 2/2006 | Linden et al. | ............... | 210/602 |
| 2005/0061737 A1* | 3/2005 | Linden et al. | ............... | 210/602 |
| 2006/0060525 A1* | 3/2006 | Hoffland | .................... | 210/603 |
| 2006/0113245 A1* | 6/2006 | Brandlmaier | .............. | 210/631 |

* cited by examiner

*Primary Examiner*—Fred Prince
(74) *Attorney, Agent, or Firm*—Lawrence E. Lambelet, Jr.

(57) ABSTRACT

A recirculating wastewater evapotranspiration and disinfection system is disclosed in which wastewater is collected, stored, aerated, and circulated through an unsaturated and optionally heated planter/filter bed containing soil microorganisms and living plants in which aerated wastewater is circulated and recirculated through the system until all of the wastewater and its constituents are utilized by any of evaporation, transpiration, gasification and living plant production and their by-products, or otherwise disinfected for reuse, while energy is gratuitously recovered in the process for productive use.

16 Claims, 1 Drawing Sheet

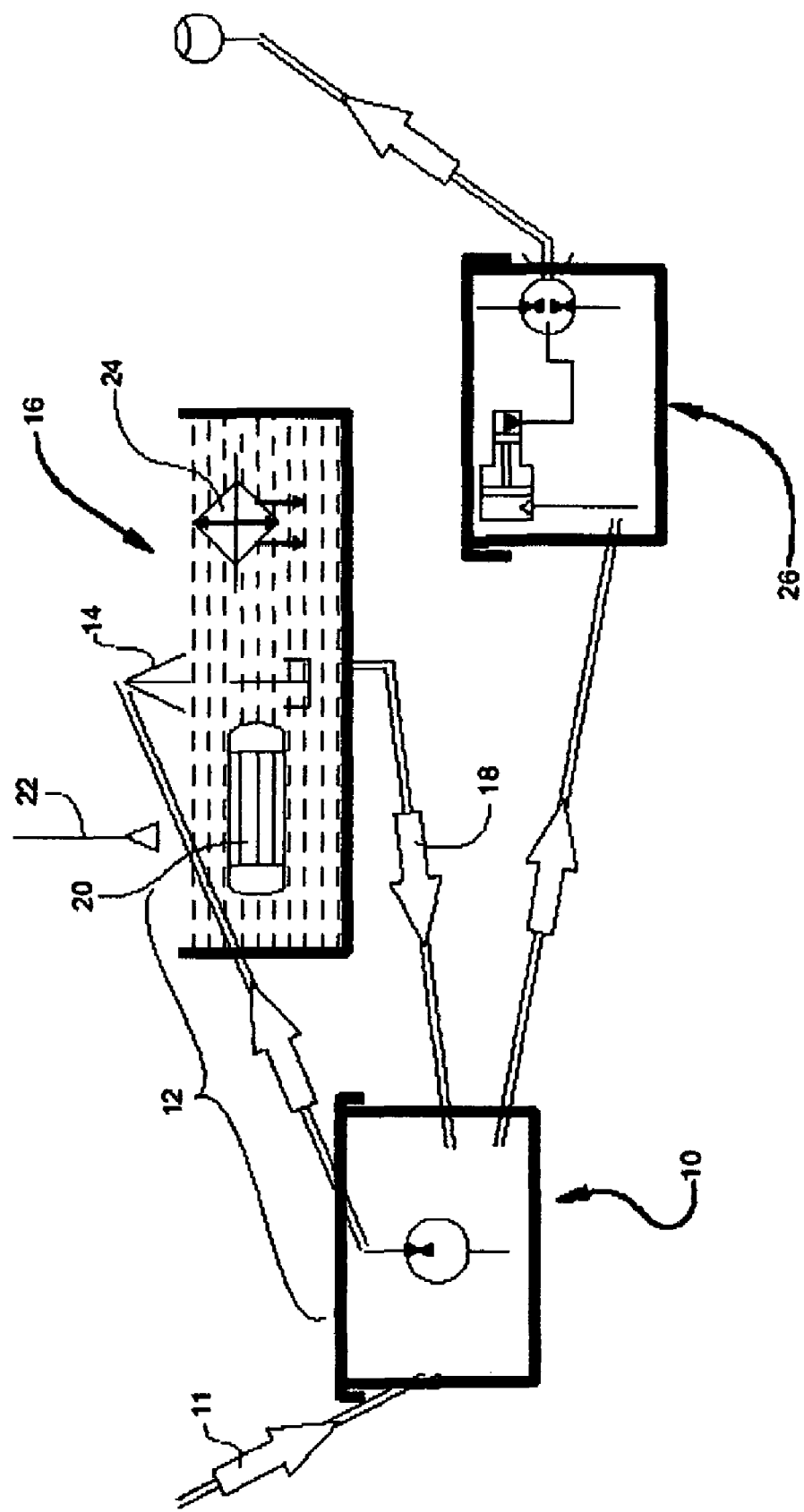

RECIRCULATING WASTEWATER EVAPOTRANSPIRATION AND DISINFECTION SYSTEM

CROSS-REFERENCE TO RELATED APPLICATIONS

Generally, the prior art is directed to the purification of waste and sewage waters in a saturated (where the components of the system are filled with effluent) system so that it can meet environmental regulations for disposal into ground or surface waters. The present invention identifies a method for aerating, filtering and utilizing the effluent in an unsaturated (where the particles are coated with effluent, but provide interstices that are empty or filled with air, soil organisms roots etc.) and most of the prior art discloses continuous treat-and-dispose technologies rather than zero-discharge processes, or they disclose the use of filters and plant root systems to clean the wastewater prior to disposal.

Nothing in the prior art describes a system of components to recirculate, filter and aerated wastewater in an unsaturated planted bed until all the wastewater has been utilized and transformed to water vapor, other gasses and beneficial phytomass that can be utilized for beneficial purposes.

It will be apparent that higher standards required for recycle or utilization of wastewaters requires the development of improved zero-discharge systems. Present economic conditions in the United States and elsewhere make highly desirable the development of technology which consumes less energy, has no polluting discharges and is more cost effective and more efficient than wastewater treatment methods presently available.

It is the object of this invention to provide a simple and effective method for utilizing wastewaters in a recirculating, unsaturated phytosphere-based zero-discharging system, which method is low in produced energy requirements (as opposed to primary solar energy), economical in operation that can produce plant material for the beneficial reuse of effluents that would otherwise be wasted.

This invention relates to the field of biologically active or ecological water purification systems using combinations of plants and microbial action, and to the physical construction of same.

It is known that biological pollution control systems can be of great effectiveness in purifying organic wastes within water. Typical systems are described in, Wolverton, U.S. Pat. No. 4,959,084 disclosing an air pollution treatment facility flowing air through a wastewater fluid and then flowing the combined fluid and pollutants through a combination of rocks, plants and microbes for purification.

Further, Wolverton, U.S. Pat. No. 5,269,094 is an apparatus for purifying waste water in an indoor environment is a container for holding the waste water to be treated together with at least one liner for receiving and holding an individual removable pot in which grows a house plant in a planting medium, typically expanded clay particles.

In addition the following are referenced:

U.S. Pat. No. 4,902,311 to Dingfors et al discloses an air purification apparatus utilizing adsorption in a fluidized bed filter medium.

U.S. Pat. No. 4,797,212, to von Nordenskjold discloses a general aeration based water purification U.S. Pat. No. 4,961,763 to Thompson, et al discloses an indoor air purifier in which plants are embedded in a layer of soil above an air plenum.

U.S. Pat. No. 4,956,936 to Sprung discloses a plant based waste water purification apparatus for greenhouses.

U.S. Pat. No. 4,931,183 to Klien et al discloses a biologically active percolating filter for purification of water.

U.S. Pat. No. 5,766,475 to Mayer discloses a recirculation/dosing tank and media bed prior to disposal.

U.S. Pat. No. 5,582,680 to Vankouwenberg discloses a wastewater evaporation device.

U.S. Pat. No. 6,129,844 to Dobelmann discloses a plant-based water purification process U.S. Pat. No. 5,536,404 to Drewery discloses a wastewater effluent management system using a sand filter.

U.S. Pat. No. 5,486,291 to Todd discloses an ecological fluidized bed for the treatment of polluted water.

U.S. Pat No. 4,904,386 to Kichwith discloses a method of purifying liquids like wastewater by means of a filter bed containing aquatic plants planted in such filter bed.

BACKGROUND OF THE INVENTION

The technologies associated with wastewater are devices that treat wastewater in a saturated aqueous environment, employing various means to remove constituents which are gasses (which are the byproduct of biological processes), accumulated solids such as grit and sludge residuals which are disposed of on land or by incineration and to dispose the partially treated remaining effluent to receiving waters. The rising awareness of the costs for treatment and disposal of wastewater and the residuals of saturated wastewater treatment is demanding that a new approach be taken that does not create any residuals nor requires the discharge of partially treated effluent into the soil or receiving waters. The invention responds to these demands by providing for the zero-discharge of effluent in an unsaturated_environment planted with valuable living plants that will use-up all of the wastewater and it's constituents by evaporation, transpiration and being incorporated into the mass of the plants themselves. This is accomplished by collecting, filtering and aerating the wastewater and distributing same by irrigation to a lined growing bed planted with plants selected based on the type of wastewater and the environment in the phytosphere. The invention is constructed to as to collect the effluent from the bed that has not been immediately utilized and recirculating via a tank and pump system it until it has all been used up. The plants additionally provide value-added benefits to the user by either providing for a beautiful landscape or greenhouse or to provide biomass products for sale as fiber, fuel, flowers or building materials. In this way the invention affords pollution prevention with economic and ecological integrity.

BRIEF SUMMARY OF THE INVENTION

A wastewater collection, treatment and utilization system is disclosed in which wastewater is collected, stored in a recycle tank, aerated and circulated through an unsaturated and optionally heated planter/filter bed containing soil microorganisms and plants (a phytosphere) in which said aerated wastewater is circulated and re-circulated through the entire system until all of the wastewater and it's constituents are utilized by either evaporation, transpiration, gasification and the production of living plants and their by-products (phytomass). The storage of wastewater in the recycle tank until plants can utilize the water and nutrients allows wastewater to be collected during cold winter months and utilized by plants during the warm growing season. A phytosphere is comprised of the rhizoplane/rhizosphere (roots of plants and their associated soils and soil organisms) and the phytomass (stalks, shoots, vines, trunks, hold-fasts, leaves, fruits, seeds and flowers).

DESCRIPTION OF THE SCHEMATIC DRAWING

The attached drawing depicts a schematic of Claim 1 showing by number the nine (9) major components of the invention which are also the nine (9) Means of Claim one (1). The Phytomass (living plants) is not depicted in these drawings as the living plant species will vary with each installation.

DETAILED DESCRIPTION OF THE INVENTION

It is therefore an object of the present invention to provide a zero-discharge system and a process for treating and utilizing wastewater in an ecologically integrated system that utilizes a constructed phytosphere to utilize all of the effluent and constituents of wastewater and produce beneficial phytomass.

It is a further object of the present invention to provide a system and a process as above which can be installed and operated at low cost and in an environmentally sound manner that can produce beneficial products from the phytomass (plant matter) grown in the system.

The foregoing objects of the present invention are attained by the wastewater treatment and utilization system and process of the present invention.

The Recirculating wastewater evapotranspiration and disinfection system of the present invention may be used to treat high or low strength wastewater such as septage, sewage, septic tank effluent, urine, dairy wastes, high-strength livestock animal waste, industrial wastewater, graywater and storm water run-off. As used herein the term "high-strength wastewater" means wastewater with BOD and nitrogen levels greater or equal to that of domestic sewage. Typically domestic sewage has an average BOD of 30-35 mg/l, total suspended solids of 10 mg/l and total nitrogen of 20 mg/l.

Optional heater: The Q10 coefficient holds that within certain limits for every 10 degrees C. temperature rise, the biochemical rate of reaction doubles. In the present invention this translates into increasing the capacity of the system without increasing the size of the system. Therefore to heat the rhizosphere is an opportunity to enhance the performance of the system. In one embodiment of the system, solar energy is collected from a greenhouse covering the phytosphere and used to heat the rhizosphere, store the collected solar energy and to permit the planting of plants that would not otherwise grow in a cold climate, such as tropical plants. In other embodiments, other fuels and sources of heat are also contemplated.

Optional disinfection: The effluent in the recycle tank may be used for productive purposes if it been disinfected to immobilize or destroy pathogens. A disinfection system (such as a device to introduce ultraviolet light, ozone or chlorine to the liquid of the fifth means) for the purpose of immobilizing or destroying living and pathogenic organisms in the liquid is disclosed.

In accordance with the present invention, a recirculating wastewater evapotranspiration and disinfection system is disclosed which wastewater is collected, stored, aerated. and distributed to an unsaturated and optionally heated planter/filter bed containing soil microorganisms and plants in which aerated wastewater is circulated and recirculated through the entire system until all of the wastewater and it's constituents are used up by either evaporation, transpiration, gasification and/or the production of phytomass.

One of the principal advantages of the present invention is that it is a closed or zero-discharging system in which all the wastewater is processed into safe and beneficial products with no contamination of the external land or water environment.

The storage of wastewater in the recycle tank until plants can utilize the water and nutrients allows wastewater to be collected during cold winter months and utilized by plants during the warm growing season. In addition the system readily lends itself to a modular construction. As a result, key components may be pre-constructed and readily assembled at a desired site at a relatively low cost to the installing entity.

Other details of the recirculating, unsaturated phytosphere-based wastewater treatment and utilization system and the process of the present invention are set out in the following detailed description and the accompanying drawings wherein like reference numerals depict like elements.

The recirculating wastewater evapotranspiration and disinfection system which can be used to treat and utilize wastewater system consists of nine (9) major components.

(1). In the first means, wastewater 11 containing solids, liquid, nutrients (nitrogen, phosphorous, potassium), carbonaceous compounds, dissolved gasses and other constituents is received and collected in a water-tight container that serves as the recycle tank 10, and (2). The second means is a system of controls, aeration device and liquid conveyance 12 for pumping or draining the liquid effluent from the first means so as to: control the rate and timing of draining or pumping and the aeration (to increase the dissolved oxygen content) of said effluent from the first means to the third means 14; and (3). The third means is a system for distributing said pretreated and aerated effluent with a pressurized or gravity irrigation system 14 to the rhizosphere (root zone) of a planter bed 16 and (4). The fourth means is a planter bed 16 filled with natural or artificial media (such as sand, stones, expanded shale or clay, perlite or vermiculite, recycled plastic or glass particles) comprising an unsaturated rhizoplane and phytosphere of living plants that functions as an integrated ecological system treating, evaporating and transpiring said pretreated liquid with aerobic and facultative microorganisms to form an effluent suitable for evaporation, transpiration by said living plants; and (5). The fifth means is a system for collecting 18 said liquid that has not been evaporated or transpired or transformed into phytomass in said fourth means and returning it to said first means 10 for recycle; and (6). the sixth means is a system for heating 20 the said fourth means, and (7). the seventh means is a system for supplying make-up water 22 to said third means should there be insufficient wastewater in the first means so as to insure the survival of the microorganisms and plants until additional effluent is presented to the first means, and (8). the eighth means is a system for the recovery of latent and sensible heat and water 24 from either the vapors produced by the evaporation and transpiration, or the influent and/or recirculated effluent, and (9). the ninth means is a disinfection system 26 (such as a device to introduce ultraviolet light, ozone or chlorine to the liquid of the fifth means) for the purpose of immobilizing or destroying living and pathogenic organisms in the liquid of the fifth means.

In an alternative embodiment of the present invention, the various components of the Recirculating wastewater evapotranspiration and disinfection system are in modular form and may located in a building, greenhouse or otherwise sheltered from precipitation.

What is claimed are:

1. A recirculating wastewater evapotranspiration and disinfection system, comprising:
   a watertight storage tank containing a quantity of wastewater;
   a planter bed comprising unsaturated media, living plants, and aerobic and facultative microorganisms surrounded by an environmental atmosphere, the living plants and microorganisms forming a rhizosphere in the media;
   a means for irrigating the rhizosphere;
   a means for aerating the wastewater intermediate the watertight storage tank and the means for irrigating;
   as means for distributing and recycling the wastewater from the watertight storage tank through the means for aerating to the means for irrigating and returning any excess drained therefrom to the storage tank, wherein the wastewater is ultimately consumed by exhaustive recycling through the rhizosphere and the environmental atmosphere to produce plant mass and vaporous discharge through transpiration, evaporation and microorganism action.

2. The recirculating wastewater evapotranspiration and disinfection system of claim 1, wherein the wastewater includes effluent from septage, sewage, industrial wastewater, animal wastewater, gray water, storm run-off or a mixture thereof.

3. The recirculating wastewater evapotranspiration and disinfection system of claim 2, wherein the wastewater constituency includes an average BOD of at least 30 mg/l, total suspended solids of at least 10 mg/l, or total nitrogen of at least 20 mg/l.

4. The recirculating wastewater evapotranspiration and disinfection system of claim 1, wherein the unsaturated media is of a natural or artificial origin or a mixture thereof.

5. The recirculating wastewater evapotranspiration and disinfection system of claim 4, wherein the natural media is at least one of sand, stones, expanded shale or clay or a mixture thereof.

6. The recirculating wastewater evapotranspiration and disinfection system of claim 4, wherein the artificial media is at least one of perlite, vermiculite, recycled plastic, glass particles or a mixture thereof.

7. The recirculating wastewater evapotranspiration and disinfection system of claim 1, wherein the means for distributing and recycling is at least partially by way of gravity flow.

8. The recirculating wastewater evapotranspiration and disinfection system of claim 1, further comprising a means for heating the planter bed.

9. The recirculating wastewater evapotranspiration and disinfection system of claim 8, wherein the means for heating is radiant solar energy held by a greenhouse covering over the environmental atmosphere.

10. The recirculating wastewater evapotranspiration and disinfection system of claim 9, wherein the solar energy is supplemented with latent and sensible heat from within the greenhouse covering.

11. The recirculating wastewater evapotranspiration and disinfection system of claim 1, further comprising a means for providing make-up water to the means for irrigating to insure the survival of the microorganisms when the wastewater supply is deficient.

12. The recirculating wastewater evapotranspiration and disinfection system of claim 1, further comprising a means for disinfecting the recycled wastewater thereby to immobilize or destroy pathogenic organisms.

13. The recirculating wastewater evapotranspiration and disinfection system of claim 12, wherein the means for disinfecting is at least one of UV light, ozone or chlorine.

14. The recirculating wastewater evapotranspiration and disinfection system of claim 1, wherein the planter bed further comprises a means for preventing seepage of wastewater into host soil thereby effectively rendering the system zero-discharge.

15. The recirculating wastewater evapotranspiration and disinfection system of claim 14, wherein the means for preventing seepage is an impervious bed liner.

16. The recirculating wastewater evapotranspiration and disinfection system of claim 1, further comprising a plurality of planter beds in a modular configuration.

* * * * *